United States Patent
Limonov

(10) Patent No.: US 8,488,869 B2
(45) Date of Patent: Jul. 16, 2013

(54) IMAGE PROCESSING METHOD AND APPARATUS

(75) Inventor: Alexander Limonov, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 953 days.

(21) Appl. No.: 12/556,699

(22) Filed: Sep. 10, 2009

(65) Prior Publication Data

US 2010/0104219 A1    Apr. 29, 2010

(30) Foreign Application Priority Data

Oct. 28, 2008    (KR) .................. 10-2008-0105928

(51) Int. Cl.
*G06K 9/00* (2006.01)
*H04N 13/00* (2006.01)

(52) U.S. Cl.
USPC ............................ 382/154; 348/42

(58) Field of Classification Search
None
See application file for complete search history.

(56) References Cited

U.S. PATENT DOCUMENTS

| | | | | | |
|---|---|---|---|---|---|
| 5,682,437 | A | * | 10/1997 | Okino et al. | 382/100 |
| 5,684,890 | A | * | 11/1997 | Miyashita et al. | 382/154 |
| 5,917,940 | A | * | 6/1999 | Okajima et al. | 382/173 |
| 6,084,978 | A | * | 7/2000 | Taylor et al. | 382/154 |
| 6,104,828 | A | * | 8/2000 | Shioiri | 382/128 |
| 6,208,758 | B1 | * | 3/2001 | Ono et al. | 382/190 |
| 6,324,001 | B2 | * | 11/2001 | Tabata | 359/462 |
| 6,614,927 | B1 | * | 9/2003 | Tabata | 382/154 |
| 6,762,755 | B2 | | 7/2004 | Chen | |
| 6,850,631 | B1 | * | 2/2005 | Oda et al. | 382/117 |
| 6,996,267 | B2 | * | 2/2006 | Tabata | 382/154 |
| 7,215,809 | B2 | * | 5/2007 | Sato et al. | 382/154 |
| 2006/0291051 | A1 | | 12/2006 | Kim et al. | |
| 2010/0103249 | A1 | * | 4/2010 | Lipton et al. | 348/51 |

FOREIGN PATENT DOCUMENTS

| | | |
|---|---|---|
| KR | 10-2006-0079545 A | 7/2006 |
| KR | 10-2007-0097162 A | 10/2007 |
| WO | WO 2007/148219 A2 | 12/2007 |

OTHER PUBLICATIONS

International Search Report and Written Opinion issued on Jun. 17, 2010, in counterpart International Application No. PCT/KR2009/006068; 11 pages in English language.

European Extended Search Report issued Nov. 8, 2012 in counterpart European Patent Application No. 09823772.0 (8 pages, in English).

Siegel, Mel, et al. "Compression and Interpolation of 3D-Stereoscopic and Multi-View Video", SPIE Proceedings, The International Society for Optical Engineering, vol. 3012, Feb. 11, 1997, pp. 227-238, XP008022271 (14 pages, in English).

* cited by examiner

*Primary Examiner* — Manav Seth
(74) *Attorney, Agent, or Firm* — NSIP Law

(57) ABSTRACT

An image processing method including: obtaining points on left-eye and right-eye images to be generated from a two-dimensional (2D) image, to which a predetermined pixel of the 2D image is to be mapped, by using the sizes of holes to be generated in the left-eye and right-eye images; and generating the left-eye and right-eye images respectively having the obtained points to which the predetermined pixel of the 2D image is mapped.

12 Claims, 6 Drawing Sheets

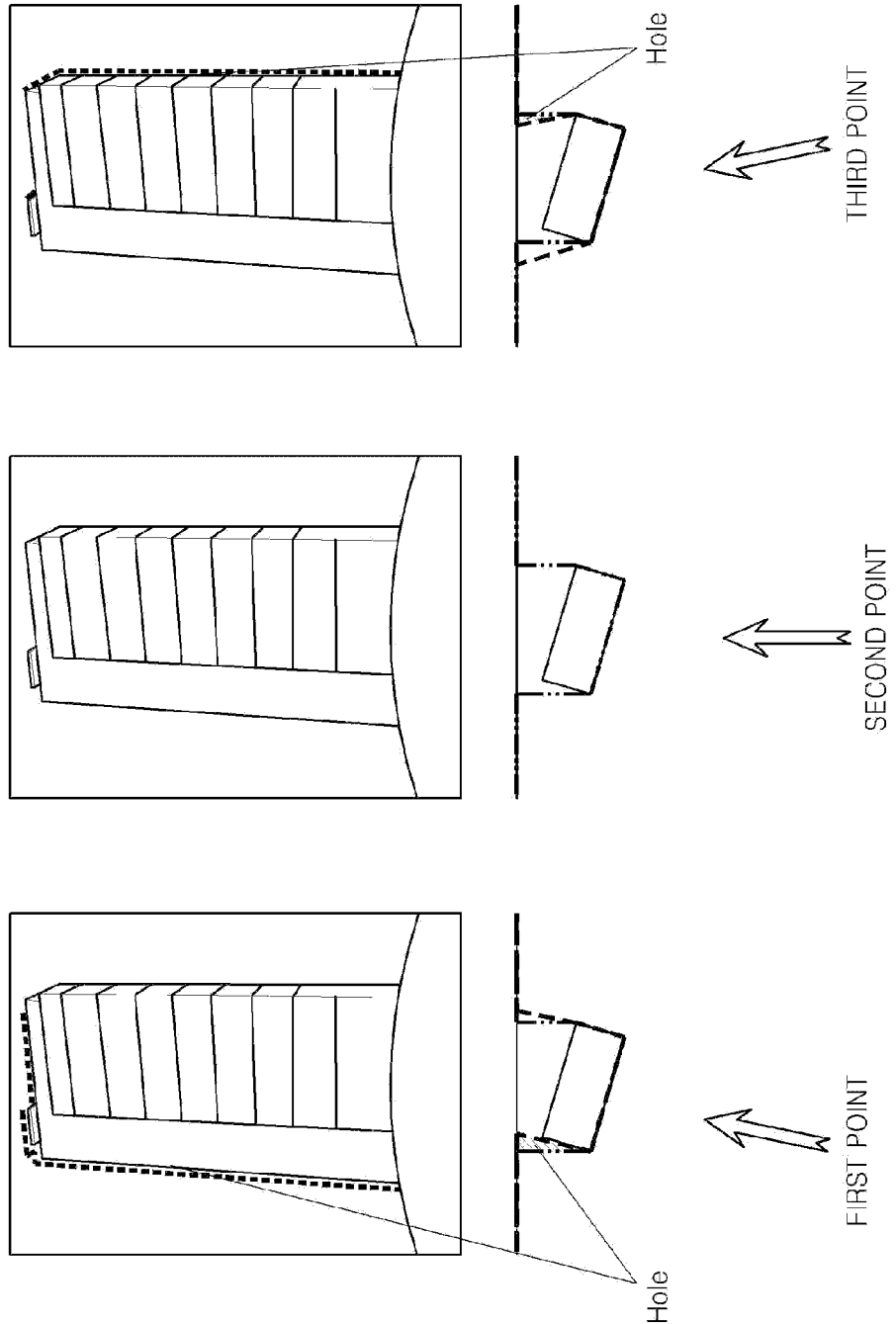

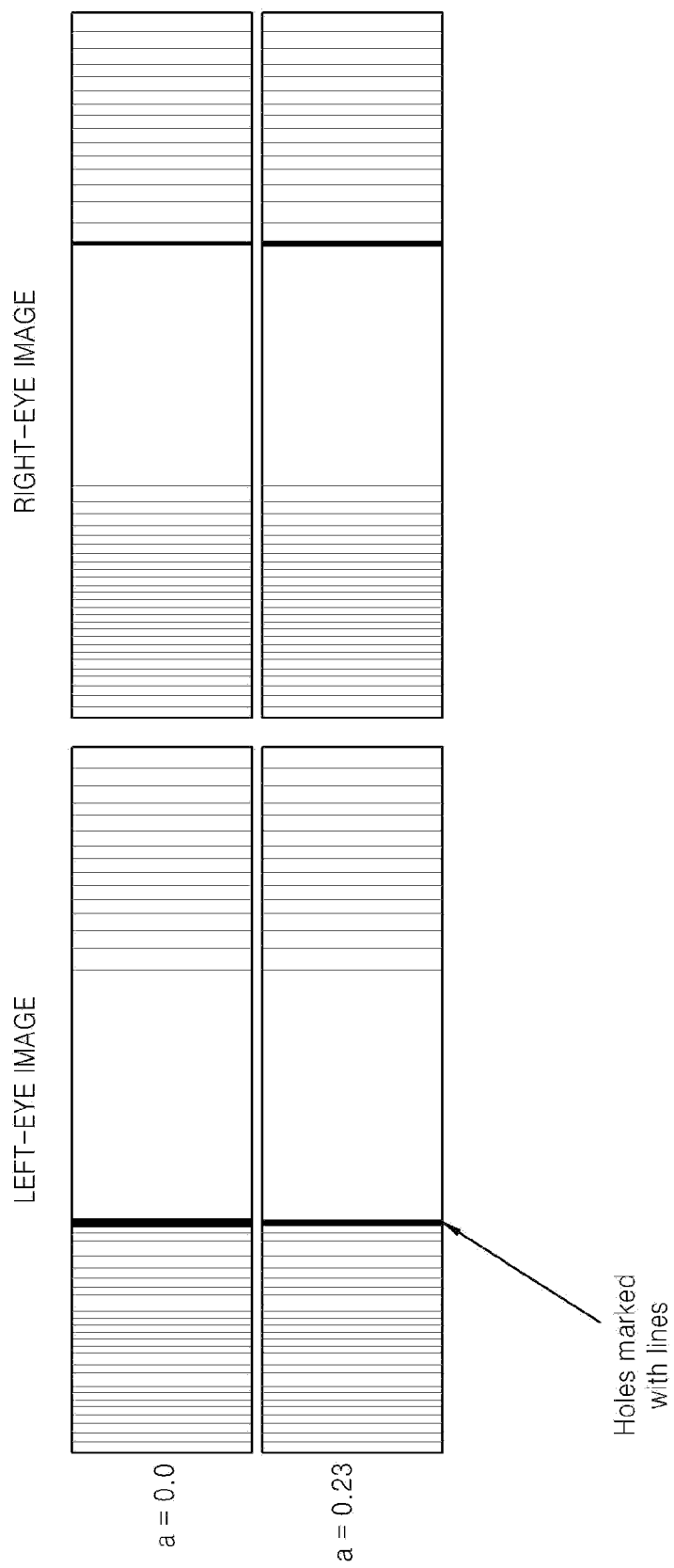

IMAGE PROCESSING METHOD AND APPARATUS

CROSS-REFERENCE TO RELATED APPLICATION

This application claims the benefit of Korean Patent Application No. 10-2008-0105928, filed on Oct. 28, 2008, in the Korean Intellectual Property Office, the disclosure of which is incorporated herein in its entirety by reference.

BACKGROUND OF THE INVENTION

1. Field of the Invention

Aspects of the present invention relate to an image processing method and apparatus, and more particularly, to a method and an apparatus to minimize a size of a hole in a three-dimensional (3D) image generated from a two-dimensional (2D) image.

2. Description of the Related Art 3D image techniques have become widely used with the development of digital technology. The 3D image techniques give information on depth to 2D images so as to represent realistic images. 3D image techniques that are being studied include a technique to generate a 3D image from video data and a technique to convert a 2D image generated from video data into a 3D image.

SUMMARY OF THE INVENTION

Aspects of the present invention provide an image processing method and apparatus to change points on left-eye and right-eye images, to which a predetermined pixel of a two-dimensional (2D) image is mapped, so as to minimize the size of a hole in a three-dimensional (3D) image generated from the 2D image when the 3D image is generated from the 2D image.

According to an aspect of the present invention, there is provided an image processing method including: obtaining points on left-eye and right-eye images to be generated from a 2D image, to which a predetermined pixel of the 2D image is to be mapped, using sizes of holes to be generated in the left-eye and right-eye images; and generating the left-eye and right-eye images respectively having the obtained points to which the predetermined pixel of the 2D image is mapped.

The obtaining of the points may include obtaining the points such that an average size of one or more holes in the left-eye image and an average size of one or more holes in the right-eye image are equal to each other.

The obtaining of the points may include determining the sizes of the holes using a depth value to be applied to the 2D image.

The determining of the sizes of holes may include dividing the 2D image into a plurality of blocks, obtaining a depth value difference between neighboring blocks by using depth values of the neighboring blocks, and determining the sizes of the hole using the depth value difference.

According to another aspect of the present invention, there is provided an image processing method including: determining an image observation point according to sizes of holes to be included in left-eye and right-eye images to be generated from a 2D image; and generating the left-eye and right-eye images using the 2D image seen from the image observation point.

The determining of the image observation point may include determining the image observation point such that an average size of one or more holes in the left-eye image and an average size of one or more holes in the right-eye image are equal to each other.

According to yet another aspect of the present invention, there is provided an image processing method including: extracting position information on points on left-eye and right-eye images to which a predetermined pixel of a 2D image is to be mapped from meta data with respect to video data; and mapping the predetermined pixel of the 2D image to the points to generate the left-eye and right-eye images by using the position information.

The meta data includes shot information to classify frames in which a composition of a background of a current frame is estimable using a previous frame as a single shot, and the extracting of the position information may include extracting position information to be applied to each shot.

The extracting of the position information from the meta data may include extracting position information to be applied to each frame of the video data.

The image processing method may further include reading the meta data from a disc or downloading the meta data from a server through a communication network.

According to another aspect of the present invention, there is provided an image processing apparatus including: a position calculator to obtain points on left-eye and right-eye images to be generated from a 2D image, to which a predetermined pixel of the 2D image is to be mapped, using the sizes of holes to be generated in the left-eye and right-eye images; and a stereo rendering unit to generate the left-eye and right-eye images having the points to which the predetermined pixel of the 2D image is mapped.

According to another aspect of the present invention, there is provided an image processing apparatus including: a position calculator to determine an image observation point according to sizes of holes to be included in left-eye and right-eye images to be generated from a 2D image; and a stereo rendering unit to generate left-eye and right-eye images using the 2D image seen from the image observation point.

According to still another aspect of the present invention, there is provided an image processing apparatus including: a meta data analyzer to extract position information on points on left-eye and right-eye images to which a predetermined pixel of a 2D image is to be mapped from meta data with respect to video data; and a stereo rendering unit to map the predetermined pixel of the 2D image to the points to generate the left-eye and right-eye images using the position information.

According to yet another aspect of the present invention, there is provided a computer readable recording medium to execute an image processing method including: obtaining points on left-eye and right-eye images to be generated from a 2D image, to which a predetermined pixel of the 2D image is to be mapped, using the sizes of holes to be generated in the left-eye and right-eye images; and generating the left-eye and right-eye images having the points to which the predetermined pixel of the 2D image is mapped.

According to another aspect of the present invention, there is provided a computer readable recording medium to execute an image processing method including: determining an image observation point according to sizes of holes to be included in left-eye and right-eye images to be generated from a 2D image; and generating the left-eye and right-eye images using the 2D image seen from the image observation point.

According to another aspect of the present invention, there is provided a computer readable recording medium to execute an image processing method including: extracting position information on points on left-eye and right-eye images to which a predetermined pixel of a 2D image is to be mapped from meta data with respect to video data; and mapping the predetermined pixel of the 2D image to the points to generate the left-eye and right-eye images by using the position information.

According to another aspect of the present invention, there is provided an image processing method including: generating, by an image processing apparatus, left-eye and right-eye images from a two-dimensional (2D) image according to sizes of holes in the left-eye and right-eye images, wherein the holes correspond to absent portions of an object in the generated left-eye and right-eye images that are respectively visible on the object when actually viewed from an image observation point corresponding to a left-eye and a right eye of which the left-eye and right-eye images are based, the portions being absent in the generated left-eye and right-eye images.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A to 2C are diagrams to explain a hole generated when a point of view in relation to a 2D image is moved;

FIG. 6 is a diagram to compare sizes of holes generated in left-eye and right-eye images according to an embodiment of the present invention.

DETAILED DESCRIPTION OF THE EMBODIMENTS

Figure 1:
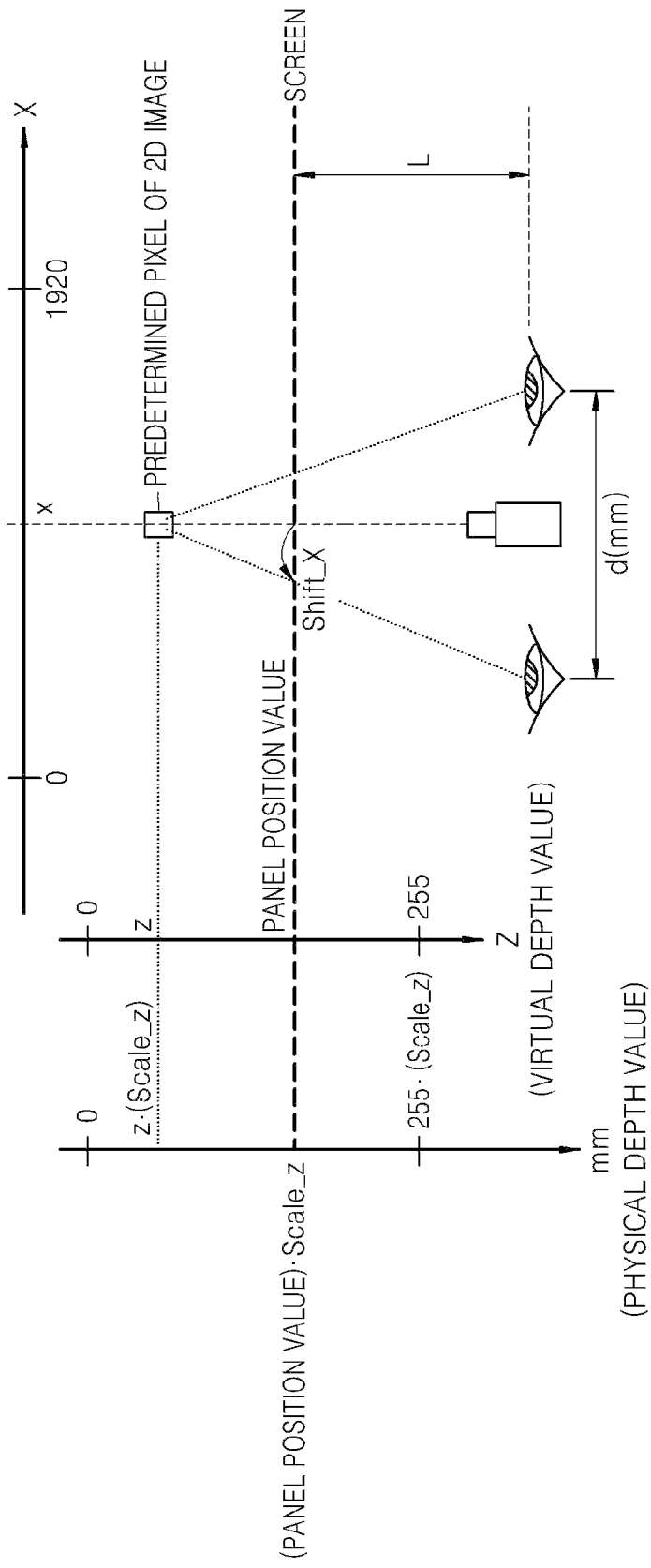
FIG. 1 illustrates an operation of generating left-eye and right-eye images using a 2D image.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates an operation of generating left-eye and right-eye images using a two-dimensional (2D) image. To obtain a stereoscopic 2D image, the 2D image is given depth. When a person sees an image projected onto a screen, the image is seen by the left and right eyes of the person. Here, a difference between two perceived images due to the space between the left and right eyes is referred to as parallax. The parallax includes a positive parallax, a zero parallax, and a negative parallax. The positive parallax corresponds to a case where the image appears to be formed behind the screen. In this case, the parallax is equal to or smaller than a distance between the left and right eyes. Accordingly, as the parallax increases, a stereoscopic effect that causes the image to seem to be located deeper than the screen is obtained.

When a 2D image appears to be formed on the plane of the screen, the parallax is zero. In this case, a viewer cannot feel the stereoscopic effect because the image appears to be formed on the plane of the screen. The negative parallax corresponds to a case where the image appears to be formed in front of the screen and is generated when lines of eyes of the viewer cross each other. In this case, a stereoscopic effect as if an object in the image protrudes from the screen is obtained.

Due to a predetermined distance in the horizontal direction between the left eye and the right eye, the left eye and the right eye see a 2D image differently, which is referred to as binocular disparity. The human brain combines the two different 2D images seen by the left eye and the right eye to generate a three-dimensional (3D) image having depth and presence. To generate the two different 2D images seen by the left eye and the right eye (i.e., left-eye and right-eye images), points on the left-eye and right-eye images are known, such that a predetermined pixel of the original 2D image is mapped thereto. Furthermore, to convert the 2D image into a 3D image, the 2D image is given depth. The points on the left-eye and right-eye images, to which the predetermined pixel of the 2D image is mapped, depend on the depth to be given to the 2D image.

Referring to FIG. 1, the X-axis represents horizontal pixels of a 2D image frame. Points on left-eye and right-eye images to which a predetermined pixel of the 2D image frame, which corresponds to a horizontal pixel value x on the X-axis, is mapped will now be described.

The Z axis, which is parallel to a direction in which a viewer views a screen, represents a degree of depth given to the 2D image (i.e., a depth value). Here, the Z axis represents a virtual depth value and a Scale_z axis represents a physical distance to which the virtual depth value is converted. A depth value corresponds to a degree of depth of an image and is used to give depth to a 2D image. In the current embodiment of the invention, the virtual depth value is a value in the range of 0 to 255. Specifically, the 2D image appears to be deeper and more distant from the viewer as the virtual depth value decreases towards zero, and the 2D image appears to be closer to the viewer as the virtual depth value increases towards 255.

A panel position corresponds to a position of the screen on which an image is formed. Accordingly, a panel position value corresponds to a depth value of the image when the parallax is zero (i.e., when the image appears to be formed on the surface of the screen). As illustrated in FIG. 1, the panel position value may have a depth value in the range of 0 to 255. When the panel position value is 255, the image included in the 2D image frame has a depth value equal to or smaller than the depth value of the screen, and thus the image is appears to be formed at a distance from the viewer (i.e., formed behind the screen). This means that the image included in the 2D image frame has a zero parallax or a positive parallax. When the panel position value is zero, the image included in the 2D image frame has a depth value equal to or greater than the depth value of the screen, and thus the image appears to be formed in front of the screen. This means that the image included in the 2D image frame has zero parallax or a negative parallax.

In FIG. 1, the viewer takes a front view of the 2D image, and thus an X-axis value of a central point between the left and right eyes of the viewer looking at the predetermined pixel of which the horizontal pixel value is x is also x. To obtain the points on the left-eye and right-eye images, to which the predetermined pixel of which the horizontal pixel value is x from among the pixels of the 2D image is mapped, a distance on the X axis between the point corresponding to the horizontal pixel value x and each of the points on the left-eye and right-eye images to which the pixel corresponding to the horizontal pixel value x is mapped is referred to as Shift_x. When the distance between the left eye and the right eye of the viewer is d, a distance between the eyes of the viewer and the screen is L, and the depth value of the predetermined pixel of the 2D image is z, the distance between the predetermined pixel of the 2D image and the center point between the left and right eyes of the viewer can be represented by the sum of a difference between the depth value of the predetermined pixel of the 2D image and the depth value of the panel position value and a distance between the panel position value and the center point between the left and right eyes of the viewer. That is, the distance between the predetermined pixel of the 2D image and the center point between the left and right eyes of the viewer is (panel position value−z)+L.

(Panel position value − z) + L: (panel position value − z) = d / 2: Scale_z, and thus Shift_x corresponds to $\frac{(\text{panel position value} - z) * \frac{d}{2} * \text{Scale\_z}}{(\text{panel position value} - z) - L}$.

When the points on the left-eye and right-eye images, to which the predetermined pixel corresponding to the X-axis value x is mapped, are respectively Xl and Xr, Xl and Xr can be represented according to Equation 1:

$$Xl = x - \text{Shift\_}x$$

$$Xr = x + \text{Shift\_}x \qquad \text{[Equation 1]}$$

As described above, according to FIG. 1, the points on the left-eye and right-eye images, to which the predetermined pixel of the 2D image is mapped, correspond to points respectively located apart from the predetermined pixel to the left and right by a predetermined distance (Shift_x).

FIGS. 2A to 2C are diagrams to explain a hole generated when a viewpoint in relation to an image is moved. An image of a predetermined object, captured by a camera or seen by a viewer, varies according to the point at which the camera or the viewer sees the object. That is, a 2D image of the object is generated differently according to the point at which the object is seen or captured. Hereinafter, the point at which the camera or the viewer captures or sees the predetermined object is referred to as an image observation point.

FIGS. 2A, 2B and 2C illustrate images of the same building, seen by the viewer from different image observation points. FIG. 2B illustrates a 2D image of the building, captured by the camera or seen by the viewer when the camera or the viewer captures or sees the building from a second image observation point in an upper part of FIG. 2B, and illustrates a cross-sectional view of the building in a lower part of FIG. 2B.

FIG. 2A illustrates a 2D image of the building, captured by the camera or seen by the viewer when the camera or the viewer sees the building from a first image observation point. The 2D image illustrated in FIG. 2A includes an image of a predetermined part of the building, which is not shown in the 2D image illustrated in FIG. 2B. That is, the 2D image illustrated in FIG. 2A includes a part shown in a dotted line that indicates an image of a left part of the building, which is seen from the point of view of the viewer at the first image observation point.

FIG. 2C illustrates a 2D image of the building, captured by the camera or seen by the viewer when the camera or the viewer sees the building from a third image observation point. The 2D image illustrated in FIG. 2C includes a part shown in a dotted line that indicates an image of a right part of the building, which is seen from the point of view of the viewer and is not shown in the 2D image illustrated in FIG. 2B. That is, the image seen by the viewer varies according to the image observation point.

As described above, pixels of the 2D image are mapped to predetermined points of the left-eye and right-eye images according to depth values of the pixels in order to generate a 3D image from the 2D image. When the left-eye and right-eye images are generated using the 2D image illustrated in FIG. 2B, the left and right parts of the building, which are respectively included in the images of FIG. 2A or 2C and are to be included in the 3D image, is not seen, because the left-eye and right-eye images are generated using only the 2D image illustrated in FIG. 2B. Accordingly, parts of the left-eye and right-eye images generated from the 2D image illustrated in FIG. 2B, which correspond to the left and right part of the building, have holes.

Figure 3C:
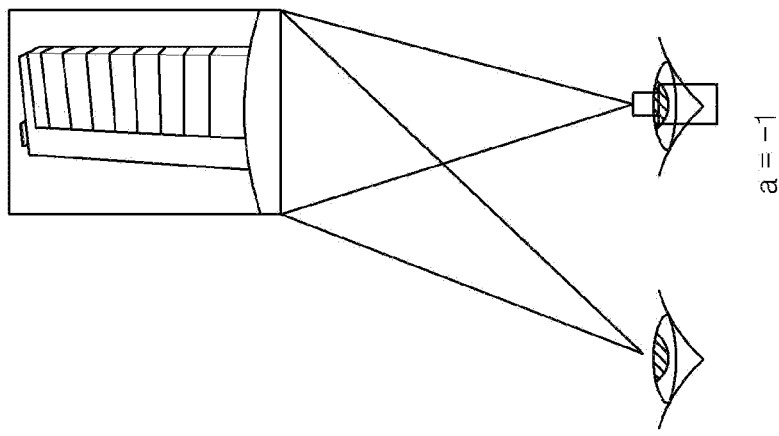
FIGS. 3A to 3C are diagrams to explain a method of converting a 2D image into a 3D image in consideration of sizes of holes generated in left-eye and right-eye images according to an embodiment of the present invention.
Figure 3B:
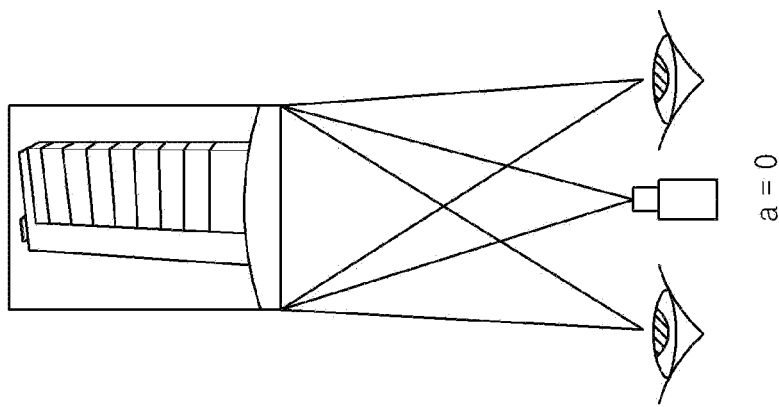
Figure 3A:
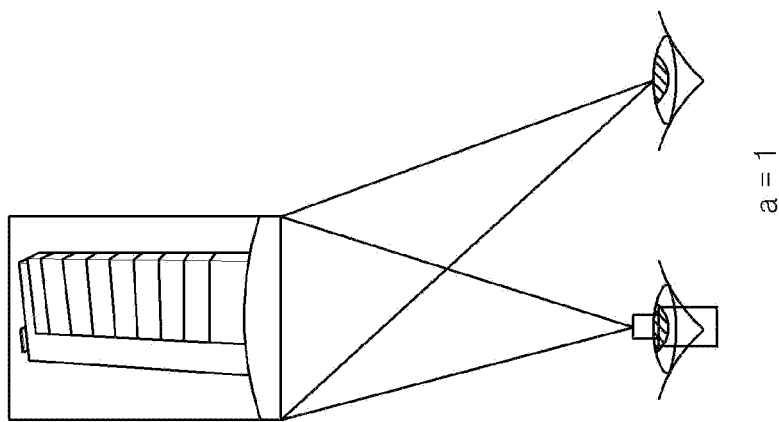

FIGS. 3A to 3C are diagrams to explain a method of converting a 2D image into a 3D image in consideration of sizes of holes generated in left-eye and right-eye images, according to an embodiment of the present invention. FIG. 3B illustrates that points on the left-eye and right-eye images, to which a predetermined pixel of the 2D image is mapped, correspond to points located apart from the predetermined pixel of the 2D image to the left and right by a predetermined distance (i.e., points located apart from the predetermined pixel by Shift_x in Equation 1), as described above with reference to FIG. 1. However, it is understood that aspects of the present invention are not limited thereto. For example, according to some aspects, the 2D image can be used as the left-eye or right-eye image.

FIG. 3C illustrates a case where the left-eye image to be generated from the 2D image is identical to the 2D image. The 2D image is used as the left-eye image and, thus, only the right-eye image is newly generated. In this case, the point on the right-eye image, to which the predetermined pixel of the 2D image is mapped, corresponds to a point located apart from the predetermined pixel of the 2D image to the right by 2*Shift_x.

Similarly, the 2D image may be used as the right-eye image and only the left-eye image may be newly generated. FIG. 3A illustrates such a case where the 2D image is used as the right-eye image. In this case, the point on the left-eye image, to which the predetermined pixel of the 2D image is mapped, corresponds to a point located apart from the predetermined pixel of the 2D image to the left by 2*Shift_x.

Aspects of the present invention consider a method of generating left-eye and right-eye images using a 2D image such that a predetermined pixel of the 2D image is mapped to points located apart from the predetermined pixel to the left and right by distances different from each other as well as a method of generating the left-eye and right-eye images such that the predetermined pixel of the 2D image is mapped to points located apart from the predetermined pixel to the left and right by the same distance (i.e., equal to Shift_x).

When the points on the left-eye and right-eye images, to which the predetermined pixel corresponding to the X-axis value x is mapped, are respectively Xl' and Xr', Xl' and Xr' can be represented according to Equation 2:

$$Xl' = x - (1-a) * \text{Shift\_}x, Xr' = x + (1+a) * \text{Shift\_}x, \qquad \text{[Equation 2]}$$

where a is a rational number greater than or equal to −1 and less than or equal to 1.

When a is zero in FIG. 3, Equation 2 becomes identical to Equation 1. In this case, the left-eye and right-eye images are generated from the 2D image such that the predetermined pixel of the 2D image is mapped at points of the left-eye and right-eye images located apart from the predetermined pixel to the left and right by the same distance (i.e., equal to Shift_x), as illustrated in FIG. 3B. However, when a is 1, Xl'=x and Xr'=x+2*Shift_x are obtained using Equation 2. Accordingly, the left-eye image generated from the 2D image becomes identical to the 2D image, as illustrated in FIG. 3C. In this case, the right-eye image corresponds to an image to which the predetermined pixel of the 2D image is mapped at a point located apart from the predetermined pixel to the right by a distance twice the distance in the case of FIG. 3B (i.e., 2*Shift_x). Similarly, when a is −1, Xl'=x−2*Shift_X and Xr'=x are obtained using Equation 2. That is, the right-eye image is identical to the 2D image and the left-eye image corresponds to an image to which the predetermined pixel of the 2D image is mapped at a point located apart from the predetermined pixel to the left by a distance twice the distance in the case of FIG. 3B (i.e., 2*Shift_x), as illustrated in FIG. 3A.

A method of acquiring the value a will now be explained. It is assumed that a single frame of the 2D image is divided into W*H blocks including W horizontal blocks and H vertical blocks. A block can be a single pixel or a set of a plurality of pixels. When a depth value of a horizontally ith and vertically jth block is $Z(i,j)$, depth values of all the blocks correspond to $Z(1,1)$ through $Z(W,H)$. The sizes of holes in the left-eye and right-eye images generated from the 2D image can be determined using a depth value difference between blocks. When a depth value difference between a current block and the next block to the right of the current block is G, G can be represented according to Equation 3:

$$G(i,j)=Z(i+1,j)-Z(i,j),\quad\text{[Equation 3]}$$

where $Z(i+1,j)$ is a depth value of a horizontally (i+1)th and vertically jth block and $Z(i,j)$ is a depth value of the horizontally ith and vertically jth block.

Functions Hl and Hr with respect to hole sizes can be obtained from Equation 4 below, which uses Equation 3:

$$Hl=\Sigma G(i,j)^{\wedge}2, G(i,j)>0 \quad\text{[Equation 4]}$$

$$Hr=\Sigma G(i,j)^{\wedge}2, G(i,j)<0,$$

where Hl and Hr respectively represent functions with respect to the sizes of holes in the left-eye and right-eye images. The relationship between the functions Hl and Hr and a can be represented according to Equation 5:

$$a=1-2[Hl/(Hl+Hr)]. \quad\text{[Equation 5]}$$

As described above, according to the current embodiment of the invention, the left-eye and right-eye images can be generated using the 2D image in consideration of the depth value of the 2D image such that the predetermined pixel of the 2D image is mapped to the points located apart from the predetermined pixel to the left and right by distances that may vary from each other.

Figure 4:
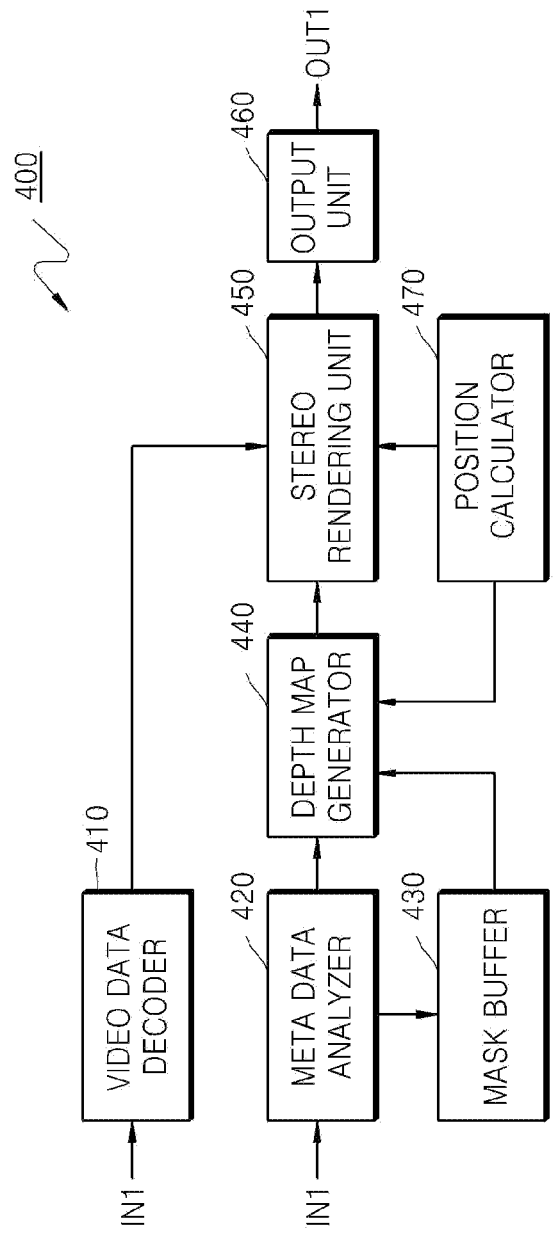
FIG. 4 is a block diagram of an image processing apparatus according to an embodiment of the present invention.

FIG. 4 is a block diagram of an image processing apparatus 400 according to an embodiment of the present invention. Referring to FIG. 4, the image processing apparatus 400 includes a video data decoder 410, a meta data analyzer 420, a mask buffer 430, a depth map generator 440, a stereo rendering unit 450, a position calculator 470, and an output unit 460 to display a 3D image generated in a 3D format on a screen. However, it is understood that the output unit 460 is not necessarily included in the image processing apparatus 400 in all embodiments of the present invention. The image processing apparatus 400 may be a television, a computer, a mobile device, a set-top box, a gaming system, etc. The output unit 460 may be a cathode ray tube display device, a liquid crystal display device, a plasma display device, an organic light emitting diode display device, etc. Moreover, while not required, each of the units 410, 420, 430, 440, 450, 460, 470 can be one or more processors or processing elements on one or more chips or integrated circuits.

To convert a 2D image into a 3D image, a method of obtaining a depth value of a current frame by using a motion difference between a previous frame and the current frame and/or a method of extracting depth information to be applied to the 2D image from meta data and using the depth information may be used. The image processing apparatus 400 illustrated in FIG. 4 employs the latter method. However, it is understood that aspects of the present invention are not limited thereto and can be applied, for example, to the method of obtaining the depth value of the current frame using a motion vector.

In the current embodiment of the present invention, meta data includes information to convert video data frames of a 2D image into a 3D image. Video data includes a series of frames and, thus, meta data to generate a depth map includes information on the frames. The information on the frames may include information to classify the frames according to a predetermined standard. For example, when a bundle of similar frames is referred to as a unit, the frames of the video data can be classified into a plurality of units (for example, a plurality of shots). In the current embodiment of the present invention, the meta data to generate the depth map includes information to classify the frames of the video data into predetermined units.

In particular, when the composition of a current frame can be estimated using a previous frame since the current and previous frames have similar compositions, the frames having similar compositions are referred to as a shot. The meta data includes shot information to classify the frames of the video data into shots. When the composition of a current frame is different from that of a previous frame since compositions of frames are remarkably changed, the current frame and the previous frame are classified into different shots. In this case, a specific value a or specific values Xl' and Xr' can be applied to all the frames included in each shot or different values a or different values Xl' and Xr' can be applied to respective frames.

When a disc (not shown) on which video data of a 2D image and meta data with respect to the video data are recorded in a multiplexed manner or a separated manner is loaded into the image processing apparatus 400, the video data decoder 410 and the meta data analyzer 420 respectively read the video data and the meta data from the disc. The meta data can be recorded in at least one of a lead-in zone, a user data zone and a lead-out zone of the disc. While not required, the image processing apparatus 400 can include a drive to read the disc directly, or can be connected to a separate drive. However, it is understood that aspects of the present invention are not limited thereto. For example, in some aspects, the image processing apparatus 400 may further include a communication unit (not shown) that communicates with an external server or an external terminal through a communication network. Accordingly, the image processing apparatus 400 can download video data and/or meta data with respect to the video data from the external server or the external terminal through the communication unit and store the video data and/or the meta data in a local storage unit (not shown) of the image processing apparatus 400. The local storage unit may be a volatile memory (such as RAM) or a non-volatile memory (such as ROM, flash memory, or a hard disk drive) Furthermore, according to other aspects, the image processing apparatus may receive the video data and/or the meta data from any type of external storage media (such as a flash memory, a universal serial bus memory, etc.).

The video data decoder 410 reads the video data from the external storage medium (such as the disc) or the local storage unit and decodes the read video data. The meta data analyzer 420 reads the meta data with respect to the video data from the disc or the local storage unit and analyzes the read meta data. When the video data is recorded on a disc, the meta data analyzer 420 may extract a disc identifier to identify the disc on which the video data is recorded from the meta data and a title identifier to indicate which title includes the video data among a plurality of titles recorded in the disc and determines which video data is related to the meta data.

Furthermore, the meta data analyzer 420 parses depth information to be applied to the current frame from the meta data and sends the depth information to the depth map generator 440. The depth information may be classified into background depth information and object depth information. The background depth information represents a depth value of a background included in a frame and the object depth information represents a depth value of an object included in the frame. The object is an individual object other than the background in the frame. Information on a mask may be defined as object region information for an object included in a currently displayed frame. In this case, the mask buffer 430 temporarily stores the mask to be applied to the frame. The mask can have a portion corresponding to the object that is in a color different from that of another portion of the mask or is perforated along the shape of the object.

The depth map generator 440 generates a depth map of the frame using the background depth information and the object depth information received from the meta data analyzer 420 and/or the mask received from the mask buffer 430. The depth map generator 440 respectively generates a depth map for the background and a depth map for the object using the meta data and sums the depth map for the background and the depth map for the object to generate the depth map for the single frame. Moreover, the depth map generator 440 sends the generated depth map to the stereo rendering unit 450.

The position calculator 470 obtains points on left-eye and right-eye images to which a predetermined pixel of the 2D image is to be mapped. For example, the position calculator 470 obtains Hl and Hr using Equations 3 and 4 when a is zero (i.e., when the points on the left-eye and right-eye images to which the predetermined pixel of the 2D image is mapped are located apart from the predetermined pixel of the 2D image by Shift-x, as illustrated in FIG. 3B). The position calculator 470 applies Hl and Hr to Equation 5 to obtain the value a and applies the value a to Equation 2 to obtain Xl' and Xr'. The position calculator 470 sends Xl' and Xr' to the stereo rendering unit 450.

Although the position calculator 470 obtains Xl' and Xr' in the current embodiment of the present invention, it is understood that aspects of the present invention are not limited thereto. For example, in other aspects, the meta data with respect to the video data may include information on Xl' and Xr'. In this case, the meta data analyzer 420 can extract the points on the left-eye and right-eye images to which the predetermined pixel of the 2D image is to be mapped (i.e., Xl' and Xr') from the meta data and sends Xl' and Xr' to the stereo rendering unit 450.

The stereo rendering unit 450 generates the left-eye and right-eye images using the video image received from the video data decoder 410 and the depth map received from the depth map generator 440. Accordingly, the stereo rendering unit 450 generates a 3D image in a 3D format including both the left-eye and right-eye images. Specifically, the stereo rendering unit 450 receives Xl' and Xr' that represent the points on the left-eye and right-eye images to which the predetermined pixel of the 2D image is to be mapped from the position calculator 470 or the meta data analyzer 420, generates the left-eye image such that the predetermined pixel of the 2D image is mapped to the point corresponding to Xl', and generates the right-eye image such that the predetermined pixel of the 2D image is mapped to the point corresponding to Xr'. The stereo rendering unit 450 generates a 3D image in a 3D format using the generated left-eye and right-eye images. The 3D format may include a top-down format, a side-by-side format, and/or an interlaced format. The stereo rendering unit 450 sends the 3D image in the 3D format to the output unit 460.

The output unit 460 sequentially displays the left-eye and right-eye images on the screen. A viewer recognizes that images are continuously and sequentially reproduced when the images are displayed at a frame rate of at least 60 Hz on the basis of one eye of the viewer. Thus, a display device displays the images at a frame rate of at least 120 Hz in order to combine the images seen by the left and right eyes of the viewer such that the viewer recognizes the combined images as a 3D image. Accordingly, the output unit 460 sequentially displays left and right images included in a frame at least every $1/120$ of a second.

Figure 5:
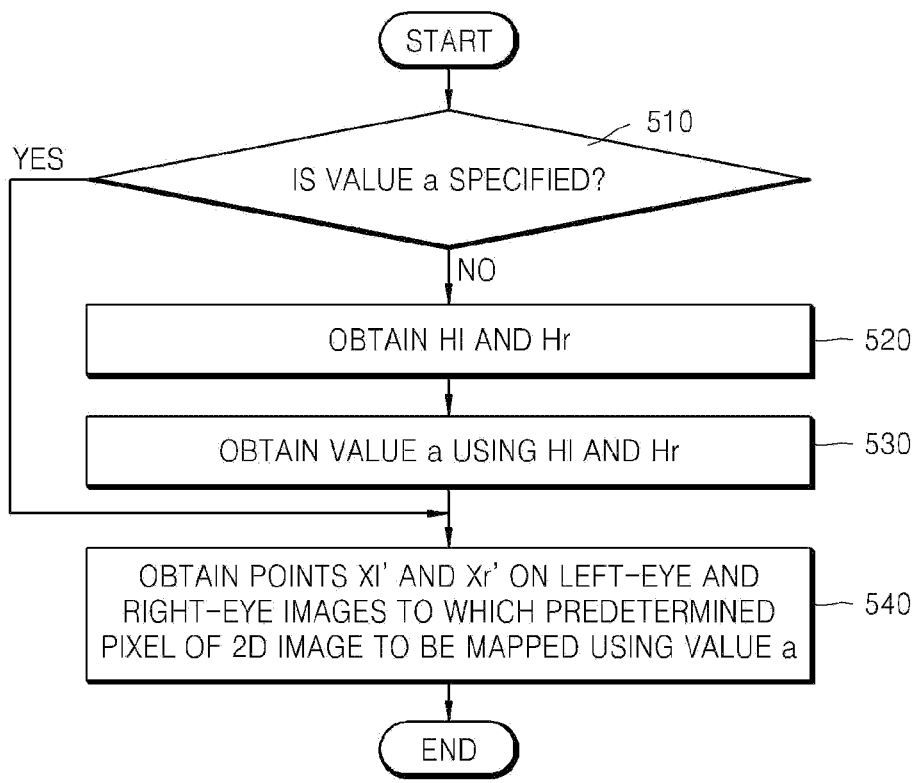
FIG. 5 is a flowchart illustrating an image processing method according to an embodiment of the present invention.

FIG. 5 is a flowchart illustrating an image processing method according to an embodiment of the present invention. Referring to FIG. 5, the image processing apparatus 400 illustrated in FIG. 4 determines whether meta data includes information on points on left-eye and right-eye images to which a predetermined pixel of a 2D image is to be mapped in operation 510. Accordingly, the image processing apparatus 400 illustrated in FIG. 4 extracts a value a from the meta data when the meta data includes the value a.

When the meta data does not include the value a (operation 510), the image processing apparatus 400 calculates the value a in operations 520 and 530. To achieve this, the image processing apparatus 400 divides a single frame into a plurality of blocks and obtains an inter-block depth difference using a depth value difference between a current block and the next block adjacent (for example, to the right of) the current block. The image processing apparatus 400 obtains functions Hl and Hr with respect to hole sizes using the inter-block depth difference in operation 520. Accordingly, the image processing apparatus 400 obtains the value a by using Hl and Hr in operation 530 and obtains the points Xl' and Xr' on the left-eye and right-eye images to which the predetermined pixel of the 2D image is to be mapped using the value a in operation 540.

FIG. 6 is a diagram to compare sizes of holes generated in left-eye and right-eye images according to an embodiment of the present invention. Upper images illustrated in FIG. 6 respectively represent hole sizes included in left-eye and right-eye images generated when a is zero. The size of a hole is represented by the thickness of a pixel including the hole in FIG. 6. It can be seen from FIG. 6 that the size of a hole generated in the left-eye image is greater than the size of a hole included in the right-eye image when a is zero. When the sizes of the holes generated in the left-eye and right-eye images are different from each other, a 3D image obtained when the left-eye image and the right-eye image are alternately displayed may seem unnatural to a viewer.

Lower images illustrated in FIG. 6 respectively represent hole sizes included in left-eye and right-eye images when a is 0.23. It can be seen from FIG. 6 that the size of the hole generated in the left-eye image when a is 0.23 is smaller than the size of the hole generated in the left-eye image when a is zero, and the size of the hole generated in the right-eye image when a is 0.23 is greater than the size of the hole generated in the right-eye image when a is zero. As illustrated, when a is 0.23, the sizes of the holes generated in the left-eye and right-eye images are equal to each other. In this case, the 3D image obtained when the left-eye and right-eye images are alternately displayed seems natural to the viewer.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet. Moreover, while not required in all aspects, one or more units of the image processing apparatus 400 can include a processor or microprocessor executing a computer program stored in a computer-readable medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image processing method comprising:
obtaining, by an image processing apparatus, points on left-eye and right-eye images to be generated from a two-dimensional (2D) image, to which a predetermined pixel of the 2D image is to be mapped, using sizes of holes to be generated in the left-eye and right-eye images; and
generating, by the image processing apparatus, the left-eye and right-eye images respectively having the obtained points to which the predetermined pixel of the 2D image is mapped.

2. The image processing method as claimed in claim 1, wherein the obtaining of the points comprises obtaining the points such that an average size of one or more holes in the generated left-eye image and an average size of one or more holes in the generated right-eye image are equal to each other.

3. The image processing method as claimed in claim 1, wherein the obtaining of the points comprises determining the sizes of the holes using a depth value to be applied to the 2D image.

4. The image processing method as claimed in claim 3, wherein the determining of the sizes of the holes comprises:
dividing the 2D image into a plurality of blocks;
obtaining a depth value difference between neighboring blocks by using depth values of the neighboring blocks; and
determining the sizes of the holes using the depth value difference.

5. The image processing method as claimed in claim 1, wherein the obtaining of the points comprises:
obtaining the point on the left-eye image according to $Xl'=x-(1-a)*Shift\_x$; and obtaining the point on the right-eye image according to $Xr'=x+(1+a)*Shift\_x$,
where $Xl'$ is a location value of the point on the left-eye image, $Xr'$ is a location value of the point on the right-eye image, x is a location value of the predetermined pixel on the 2D image, $Shift\_x$ is a value corresponding to a shift of the predetermined pixel from x in the left-eye and right-eye images, and a is a value in a range from −1 to 1 corresponding to the sizes of the holes to be generated.

6. The image processing method as claimed in claim 5, wherein a is obtained from meta data corresponding to the 2D image.

7. The image processing method as claimed in claim 1, wherein the holes correspond to absent portions of an object and/or a background in the generated left-eye and right-eye images that are respectively visible on the object when actually viewed from image observation points respectively corresponding to a left-eye and a right eye of which the left-eye and right-eye images are based, the portions being absent in the generated left-eye and right-eye images.

8. An image processing apparatus comprising:
a position calculator to obtain points on left-eye and right-eye images to be generated from a two-dimensional (2D) image, to which a predetermined pixel of the 2D image is to be mapped, using sizes of holes to be generated in the left-eye and right-eye images; and
a stereo rendering unit to generate the left-eye and right-eye images respectively having the obtained points to which the predetermined pixel of the 2D image is mapped.

9. The image processing apparatus as claimed in claim 8, wherein the position calculator determines the sizes of the holes using a depth value to be applied to the 2D image.

10. The image processing apparatus as claimed in claim 9, wherein the position calculator divides the 2D image into a plurality of blocks, obtains a depth value difference between neighboring blocks by using depth values of the neighboring blocks, and determines the sizes of the holes by using the depth value difference.

11. The image processing apparatus as claimed in claim 8, wherein the position calculator obtains the point on the left-eye image according to $Xl'=x-(1-a)*Shift\_x$, and obtains the point on the right-eye image according to $Xr'=x+(1+a)*Shift\_x$, wherein $Xl'$ is a location value of the point on the left-eye image, $Xr'$ is a location value of the point on the right-eye image, x is a location value of the predetermined pixel on the 2D image, $Shift\_x$ is a value corresponding to a shift of the predetermined pixel from x in the left-eye and right-eye images, and a is a value in a range from −1 to 1 corresponding to the sizes of the holes to be generated.

12. A non-transitory computer readable recording medium encoded with computer instructions for executing the method of claim 1 and implemented by the image processing apparatus.

* * * * *